(12) United States Patent
Zhu

(10) Patent No.: US 12,365,554 B2
(45) Date of Patent: Jul. 22, 2025

(54) DUAL POWER DRIVING-BASED PARALLEL MOVABLE SHELF AND UNLOADING APPARATUS THEREOF

(71) Applicant: Zhejiang Libiao Robots Co., Ltd., Zhejiang (CN)

(72) Inventor: Jianqiang Zhu, Zhejiang (CN)

(73) Assignee: Zhejiang Libiao Robots Co., Ltd., Zhejiang (CN)

( * ) Notice: Subject to any disclaimer, the term of this patent is extended or adjusted under 35 U.S.C. 154(b) by 198 days.

(21) Appl. No.: 18/037,448

(22) PCT Filed: Jun. 16, 2021

(86) PCT No.: PCT/CN2021/100353
§ 371 (c)(1),
(2) Date: May 17, 2023

(87) PCT Pub. No.: WO2022/174538
PCT Pub. Date: Aug. 25, 2022

(65) Prior Publication Data
US 2024/0010449 A1    Jan. 11, 2024

(30) Foreign Application Priority Data

Feb. 21, 2021    (CN) .......................... 202110194574.7

(51) Int. Cl.
*B65G 1/04*        (2006.01)
*B65G 1/02*        (2006.01)
(Continued)

(52) U.S. Cl.
CPC ............. *B65G 65/38* (2013.01); *B65G 1/026* (2013.01); *B65G 1/0407* (2013.01); *B65G 1/0435* (2013.01); *B65G 1/10* (2013.01)

(58) Field of Classification Search
CPC .... B65G 1/026; B65G 1/0407; B65G 1/0435; B65G 1/10; B65G 41/003; B65G 65/38; B66F 9/087
(Continued)

(56) References Cited

U.S. PATENT DOCUMENTS

| 5,199,531 A | 4/1993 | Malin |
| 9,802,758 B2 | 10/2017 | Tanaka |

(Continued)

FOREIGN PATENT DOCUMENTS

| CN | 201052958 Y | 4/2008 |
| CN | 103926090 A | 7/2014 |

(Continued)

OTHER PUBLICATIONS

Written Opinion of The International Searching Authority of WO2022174538, dated Nov. 17, 2021.
(Continued)

*Primary Examiner* — Saul Rodriguez
*Assistant Examiner* — Brendan P Tighe
(74) *Attorney, Agent, or Firm* — Warner Norcross + Judd LLP

(57) ABSTRACT

Disclosed are a dual power driving-based parallel movable shelf and an unloading apparatus thereof. The parallel movable shelf comprises: an upper transverse rod, an upper sliding block and an upper power driving apparatus being fixed on the upper transverse rod, and the upper power driving apparatus being able to control the upper sliding block to move back and forth only along the upper transverse rod; a lower transverse rod, arranged parallel to the upper transverse rod, a lower sliding block and a lower power driving apparatus being fixed on the lower transverse rod, and the lower power driving apparatus being able to control the lower sliding block to move back and forth only (Continued)

along the lower transverse rod; and a vertical rod, the top of the vertical rod being coupled to the upper sliding block, and the bottom of the vertical rod being coupled to the lower sliding block.

20 Claims, 6 Drawing Sheets

(51) Int. Cl.
  *B65G 1/10* (2006.01)
  *B65G 65/38* (2006.01)
(58) Field of Classification Search
  USPC .................................................. 414/281, 282
  See application file for complete search history.

(56) References Cited

U.S. PATENT DOCUMENTS

| | | | |
|---|---|---|---|
| 9,944,464 B2 | 4/2018 | Ueda et al. | |
| 2005/0036858 A1* | 2/2005 | Ueda .................... | B65G 1/0435 |
| | | | 414/280 |
| 2006/0285947 A1* | 12/2006 | Hansl .................. | B65G 1/0407 |
| | | | 414/277 |
| 2006/0285948 A1* | 12/2006 | Tsujimoto ............ | B65G 1/0407 |
| | | | 414/279 |
| 2006/0291992 A1* | 12/2006 | Tsujimoto ............ | B65G 1/0407 |
| | | | 414/807 |
| 2007/0032903 A1* | 2/2007 | Tsujimoto ............ | B65G 1/0407 |
| | | | 700/214 |
| 2007/0144991 A1* | 6/2007 | Hansl .................. | B65G 1/0407 |
| | | | 211/121 |
| 2014/0140794 A1* | 5/2014 | Adachi ............. | H01L 21/67769 |
| | | | 254/113 |
| 2016/0167879 A1* | 6/2016 | Masuda ............... | B65G 1/0421 |
| | | | 414/274 |
| 2024/0174442 A1* | 5/2024 | Yoshimoto ........... | B65G 1/0435 |

FOREIGN PATENT DOCUMENTS

| | | |
|---|---|---|
| CN | 105236311 A | 1/2016 |
| CN | 108238400 A | 7/2018 |
| CN | 209478180 U | 10/2019 |
| CN | 110641019 A | 1/2020 |
| CN | 211055974 U | 7/2020 |
| CN | 211056046 U | 7/2020 |
| CN | 211109292 U | 7/2020 |
| CN | 212221338 U | 12/2020 |
| CN | 212291492 U | 1/2021 |
| JP | H10120184 A | 5/1998 |
| JP | 2016052947 A | 4/2016 |
| WO | 9101265 A1 | 2/1991 |

OTHER PUBLICATIONS fnternational Search Report of WO2022174538, dated Oct. 29, 2021.
Notification to Grant Patent Right for Invention of Priority Application CN2021101945747.
First search of Priority Application CN2021101945747.
First Office Action of Priority Application of CN2021101945747.
First Office Action of Application No. CN2021101945747.
Decision to Grant a Patent with Application No. CN2021101945747.

* cited by examiner

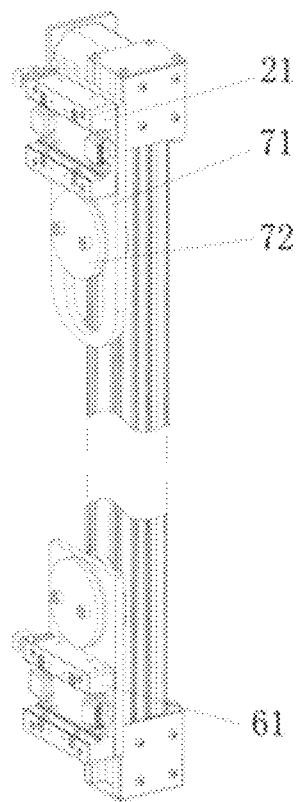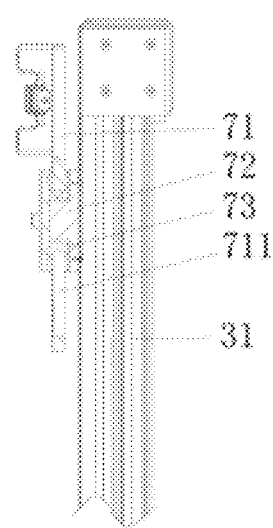
FIG. 5
FIG. 6

DUAL POWER DRIVING-BASED PARALLEL MOVABLE SHELF AND UNLOADING APPARATUS THEREOF

CROSS-REFERENCE TO RELATED APPLICATION

The present disclosure claims the priority to the Chinese patent application with the filing No. CN202110194574.7 filed with the Chinese Patent Office on Feb. 21, 2021, and entitled "Dual Power Driving-based Parallel Movable Shelf and Unloading Apparatus thereof", the contents of which are incorporated herein by reference in entirety.

TECHNICAL FIELD

The present disclosure relates to a dual power driving-based parallel movable shelf and an unloading apparatus thereof.

BACKGROUND ART

Moving an object by means of a structure of guide rail and sliding block is a common structure in the mechanical industry. In order to improve the stability, a double guide rail structure is generally selected, and to control two sliding blocks to respectively move back and forth along the two guide rails, there must be a power driving apparatus. When a distance between the two guide rails is relatively large, a mechanical synchronization structure generally can be selected to make the sliding blocks move synchronously. There is an application in which when goods are discharged on shelves of different heights through the structure of guide rail and sliding block, the shelves may be very high, in this case, use of the mechanical synchronization structure is very costly and it is very heavy. It is more advantageous to drive movement of the sliding blocks respectively by dual power, but the dual-power-driven structure must maintain quite good synchronization performance, however, there will be more or less errors when driving timing pulley and timing belt by a high-precision motor to drive the sliding blocks to move, and the existence of the errors causes generation of torsion between the two sliding blocks and a coupling rod. An unreasonable design may damage the sliding blocks or relevant structures coupled with the sliding blocks, such as the coupling rod.

SUMMARY

According to the above requirements, a dual power driving-based parallel movable shelf and an unloading apparatus thereof are provided. An embodiment of the present disclosure provides a dual power driving-based parallel movable shelf, including:
  a rack;
  an upper transverse rod, wherein two ends of the upper transverse rod are respectively fixed to the rack, the upper transverse rod is fixed with an upper sliding block and an upper power driving apparatus, and the upper power driving apparatus can control the upper sliding block to move only back and forth along the upper transverse rod;
  a lower transverse rod, wherein two ends of the lower transverse rod are respectively fixed to the rack, the lower transverse rod and the upper transverse rod are arranged substantially parallel to each other, the lower transverse rod is fixed with a lower sliding block and a lower power driving apparatus, and the lower power driving apparatus can control the lower sliding block to move only back and forth along the lower transverse rod;
  a vertical rod, wherein a top portion of the vertical rod is coupled to the upper sliding block through an upper adjusting apparatus, and a bottom portion of the vertical rod is coupled to the lower sliding block through a lower adjusting apparatus;
  a controller, which is electrically connected to motors of the upper power driving apparatus and the lower power driving apparatus respectively, wherein
  when the upper sliding block and the lower sliding block drive the vertical rod to move towards the same direction, the upper adjusting apparatus can make the vertical rod rotate by an angle relative to the upper transverse rod, and the lower adjusting apparatus can make the vertical rod rotate by an angle relative to the lower transverse rod; the upper adjusting apparatus can make the vertical rod move up and down by a distance relative to the upper transverse rod, and/or the lower adjusting apparatus can make the vertical rod move up and down by a distance relative to the lower transverse rod.

Optionally, the upper adjusting apparatus or the lower adjusting apparatus includes:
  an adjusting plate, wherein the adjusting plate is provided with an adjusting hole, and one end of the adjusting plate is fixed to the upper sliding block or the lower sliding block; and
  an adjusting column, wherein a circumferential surface of the adjusting column is provided with an annular groove, a part of the adjusting plate is embedded into the annular groove so that the adjusting plate can rotate with the adjusting column as center, and the adjusting column is fixed to the vertical rod.

Optionally, the upper adjusting apparatus or the lower adjusting apparatus further includes:
  a flexible separation column, wherein the flexible separation column is provided with an annular cavity and a through hole, the flexible separation column is embedded into the annular groove of the adjusting column, a part of the adjusting plate is embedded into the annular cavity, and the flexible separation column can separate the adjusting plate from the adjusting column.

Optionally, the flexible separation column is made of plastic, and the plastic is preferably a polytetrafluoroethylene material or polypropylene.

Optionally, the upper transverse rod and the lower transverse rod are made of aluminum profiles.

Optionally, the adjusting column is composed of two parts, and the two parts of the adjusting column are fastened together in a manner of capable of promoting installation and replacement of the flexible separation column.

Optionally, an adjusting hole of the adjusting plate of at least one of the upper adjusting apparatus and the lower adjusting apparatus is an elongated hole, and the adjusting column can move up and down in the elongated hole.

Optionally, the upper power driving apparatus includes:
  optionally, the upper transverse rod, wherein the upper transverse rod is of a hollow structure, the upper transverse rod is provided with an open end, and two side surfaces, such as an upper side surface and a lower side surface, of the upper transverse rod are provided with a groove;

a first timing pulley and a second timing pulley, which can be respectively rotatably fixed in two end portions of the upper transverse rod;

a timing belt, which is wound outside the first timing pulley and the second timing pulley;

a motor, wherein a housing of the motor is fixed to the upper transverse rod, a rotating shaft of the motor is fixed to a central shaft of the first timing pulley or the second timing pulley, and the motor is electrically connected to the controller; and the upper sliding block, wherein the upper sliding block is provided with a bump and two sliding rails, the bump can be embedded into the open end of the upper transverse rod and fixed to the timing belt, and the sliding rails can only move back and forth along the groove, wherein the lower power driving apparatus is of the same structure as the upper power driving apparatus, the upper transverse rod can be replaced with the lower transverse rod, and the upper sliding block can be replaced with the lower sliding block.

An unloading apparatus of a dual power driving-based parallel movable shelf, including:

the dual power driving-based parallel movable shelf, wherein the vertical rod is fixed with a vertical power driving apparatus and a vertical sliding block, the vertical power driving apparatus is of the same structure as the upper power driving apparatus, the vertical rod replaces the upper transverse rod, the vertical sliding block replaces the upper sliding block, and a motor of the vertical power driving apparatus is electrically connected to the controller; and a discharging apparatus, wherein the discharging apparatus is fixed on the vertical sliding block, and can discharge received goods onto a predetermined shelf.

Optionally, the discharging apparatus includes:

a discharging frame, which is fixed to the vertical sliding block;

a first speed reducer;

a rotation motor, wherein a housing of the rotation motor is fixed to a housing of the first speed reducer, and a rotating shaft of the rotation motor is fixed to an input shaft of the first speed reducer, and the rotation motor is electrically connected to the controller;

a rotation bracket, which is fixed to an output shaft of the first speed reducer;

a rotation tray, which is fixed to the rotation bracket, wherein the rotation tray can be configured to hold goods;

a second speed reducer, a housing of which is fixed to the discharging frame;

a swing motor, wherein a housing of the swing motor is fixed to the housing of the second speed reducer, and a rotating shaft of the swing motor is fixed to an input shaft of the second speed reducer, and the swing motor is electrically connected to the controller, and a swing rod, of which one end can be fixed to an output shaft of the second speed reducer, and the other end is fixed to the housing of the first speed reducer, wherein rotation of the swing motor can drive the swing rod to rotate through the second speed reducer, so as to swing the rotation tray loaded with goods from outside of the shelf to above a predetermined container, and rotation of the rotation motor can drive the rotation bracket to rotate through the first speed reducer, so as to discharge the goods into the shelf.

Optionally, two rows of the shelves are provided, the two rows of shelves are respectively located at two sides of the rack, and the discharging apparatus can make the rotation tray rotate to above a predetermined side of the shelves at two sides through the swing motor and the second speed reducer, so as to discharge the goods into one of the containers.

Each shelf is provided with multiple layers, each layer is provided with two blocking bars, multiple containers can be placed on the two blocking bars, and the containers can be taken out from the two blocking bars.

Compared with the prior art, the present disclosure at least has the following advantages. The aluminum alloy profile can be selected as the upper transverse rod, the lower transverse rod, and the vertical rod, and the cost is greatly reduced; the vertical rod can be very long, and can be adapted to shelves of different heights; it is quite flexible and fast to load and unload goods; the upper transverse rod, the lower transverse rod, and the vertical rod are allowed to have a relatively large matching error, thus reducing the installation requirements of the movable shelf; the synchronization accuracy of the dual power driving is reduced; and the overall service lifetime is significantly extended.

The present disclosure has at least the beneficial effects of reasonable structure, convenient installation, long service lifetime, being suitable for unloading shelves of different heights, and high unloading efficiency.

BRIEF DESCRIPTION OF DRAWINGS

FIG. 5 is a structural schematic diagram of an upper adjusting apparatus and a lower adjusting apparatus in the present disclosure.

FIG. 6 is a partial sectional view of the upper adjusting apparatus in the present disclosure.

DETAILED DESCRIPTION OF EMBODIMENTS

Figure 1:
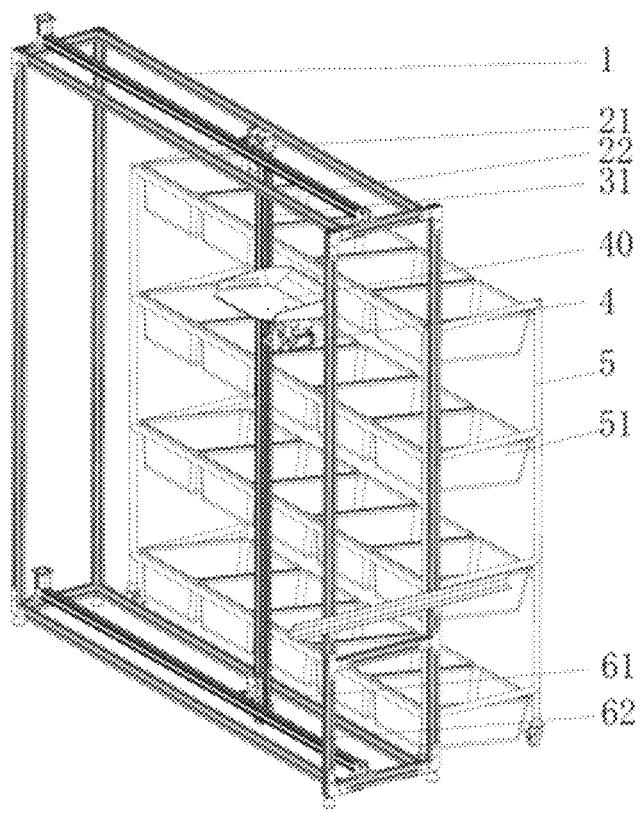
FIG. 1 is an overall structural schematic diagram of the present disclosure.
Figure 2:
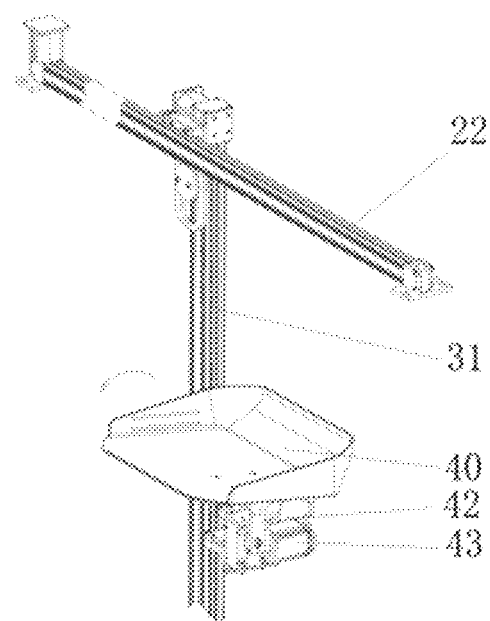
FIG. 2 is a structural schematic diagram of coupling of upper transverse rod and vertical rod in the present disclosure.
Figure 3:
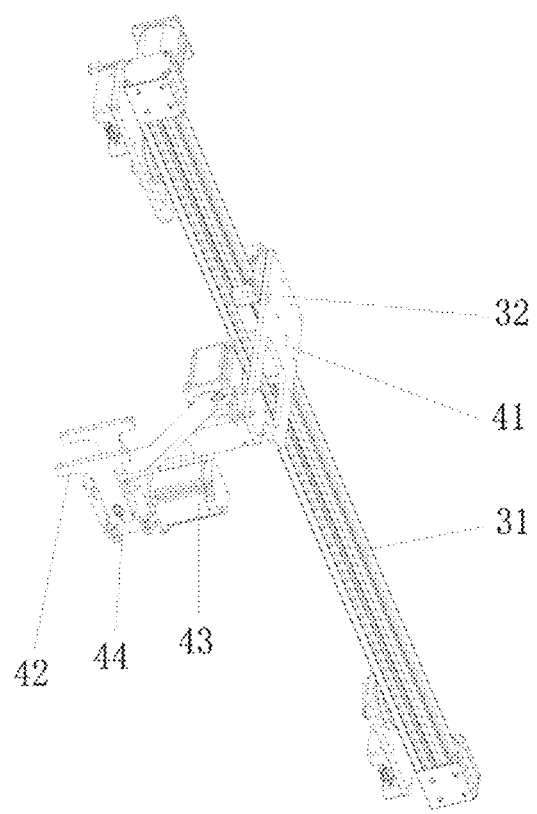
FIG. 3 is a structural schematic diagram of a state of an unloading apparatus in the present disclosure.
Figure 4:
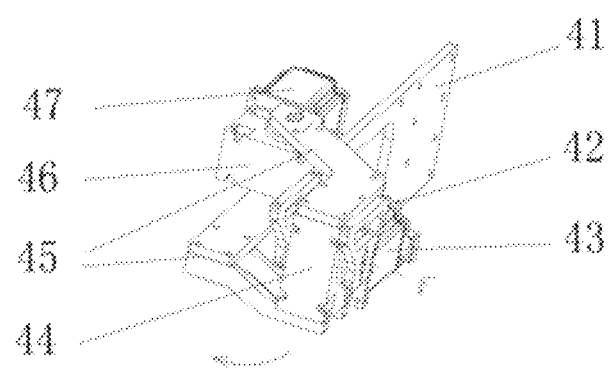
FIG. 4 is a structural schematic diagram of another state of the unloading apparatus in the present disclosure.

The present disclosure is described with reference to the drawings:

As shown in FIG. 1, FIG. 2, and FIG. 3, a dual power driving-based parallel movable shelf may include:

a rack 1;

an upper transverse rod 22, wherein two ends of the upper transverse rod can be respectively adjustably fixed to the rack 1 through end fixing parts, the upper transverse rod 22 can be fixed with an upper sliding block 21 and an upper power driving apparatus 2, and the upper power driving apparatus 2 can drive the upper sliding block 21 to move back and forth only along the upper transverse rod 22;

a lower transverse rod 62, wherein two ends of the lower transverse rod can be respectively adjustably fixed to the rack 1, the lower transverse rod 62 and the upper transverse rod 22 can be arranged substantially parallel to each other, the lower transverse rod 62 can be fixed with a lower sliding block 61 and a lower power driving apparatus, and the lower power driving apparatus can drive the lower sliding block 61 to move back and forth only along the lower transverse rod 62;

a vertical rod 31, wherein a top portion of the vertical rod can be coupled to the upper sliding block 21 through an upper adjusting apparatus, and a bottom portion of the vertical rod can be coupled to the lower sliding block 61 through a lower adjusting apparatus;

a controller, which can be electrically connected to motors of the upper power driving apparatus 2 and the lower power driving apparatus respectively, wherein when the upper sliding block 21 and the lower sliding block 61 drive the vertical rod 31 to move towards the same direction, the upper adjusting apparatus can make the vertical rod 31 rotate by an angle relative to the upper transverse rod 22, and the lower adjusting apparatus can make the vertical rod 31 rotate by an angle relative to the lower transverse rod 62; the upper adjusting apparatus can make the vertical rod 31 move up and down by a distance relative to the upper transverse rod 22, and/or the lower adjusting apparatus can make the vertical rod 31 move up and down by a distance relative to the lower transverse rod 62.

It should be noted that, in the overall structure of the dual-power-driven parallel movable shelf, due to existence of deformation, installation error and/or synchronization error and so on of the upper transverse rod 22, the lower transverse rod 62, and the vertical rod 31, the vertical rod cannot always move completely in parallel, and the same side (for example, left side or right side) of the vertical rod 31 has a tiny rotation angle relative to the upper transverse rod 22 and/or the lower transverse rod 62, that is, an angle of the same side of the vertical rod 31 relative to the upper transverse rod 22 and/or the lower transverse rod 62 is not 90 degrees as in an ideal case. For example, this deflection angle may have positive deflection, i.e., the angle of the same side of the vertical rod 31 relative to the upper transverse rod 22 and/or the lower transverse rod 62 is, for example, greater than 90 degrees; and this deflection angle may also have negative deflection, i.e., the angle of the same side of the vertical rod 31 relative to the upper transverse rod 22 and/or the lower transverse rod 62 is, for example, less than 90 degrees; and this deflection angle is always changing. When the vertical rod itself is relatively long, torque generated by two ends thereof respectively driven by two driving apparatuses for moving is quite large, and this torque is liable to damage rigid coupling parts of the vertical rod 31 with the upper transverse rod 22 and the lower transverse rod 62. Besides, existence of the deflection angle tends to vary the length of the vertical rod 31 between a coupling point of the vertical rod 31 and the upper transverse rod 22 and a coupling point of the vertical rod 31 and the lower transverse rod 62. With the upper adjusting apparatus and the lower adjusting apparatus, the vertical rod 31 can self-adaptively rotate by an angle relative to the upper transverse rod 22 and/or the lower transverse rod 62 and move up and down by a distance, so as to eliminate the torque and eliminate the stress, thereby protecting the sliding blocks and the like from damage.

Optionally, as shown in FIG. 5 and FIG. 6, the upper adjusting apparatus and the lower adjusting apparatus may include:

an adjusting plate 71, wherein the adjusting plate may be provided with an adjusting hole 711, one end of the adjusting plate 71 may be fixed to the upper sliding block 21 or the lower sliding block 61; obviously, the upper adjusting apparatus is corresponding to the upper sliding block 21, and the lower adjusting apparatus is corresponding to the lower sliding block 61; and an adjusting column 72, wherein a circumferential surface of the adjusting column may be provided with an annular groove, the adjusting hole 711 is sleeved on the annular groove and is capable of rotating with the adjusting column 72 as center, and the adjusting column 72 is fixed to the vertical rod 31.

An embodiment of the present disclosure provides a specific mode in which an angle can be rotated through the adjusting apparatus.

Since materials of components have similar rigidity and relative movement may occur therebetween, friction may be generated to damage the vertical rod 31, the upper sliding block 21, and the lower sliding block 61, and for this reason, the upper adjusting apparatus or the lower adjusting apparatus further may include:

a flexible separation column 73, wherein the flexible separation column can be provided with an annular cavity and a through hole, the flexible separation column 73 can be embedded into the annular groove of the adjusting column 72, a part of the adjusting plate 71 can be embedded into the annular cavity, the flexible separation column 73 can separate the adjusting plate 71 from the adjusting column 72. With the flexible separation column 73, the vertical rod 31, the upper sliding block 21, and the lower sliding block 61 can be effectively protected. Generally, the flexible separation column 73 is a vulnerable part, but it can be replaced.

Optionally, the adjusting column 72 may be composed of two parts, and the two parts of the adjusting column 72 are fastened together by a fastener, so as to facilitate installation and replacement of the flexible separation column 73.

Optionally, the flexible separation column 73 can be made of plastic, the plastic can be selected from a polytetrafluoroethylene material or polypropylene, etc., which has the characteristics of moderate smoothness and hardness, and the upper transverse rod 22 and the lower transverse rod 62 can be made of aluminum profiles, which are relatively hard compared with the flexible separation column 73.

Optionally, the adjusting hole 711 of the adjusting plate 71 of at least one of the upper adjusting apparatus and the lower adjusting apparatus may be an elongated hole, and the adjusting column 72 can move up and down in the elongated hole, which provides an optional embodiment of realizing a structure of moving the vertical rod 31 up and down by a distance.

Figure 7:
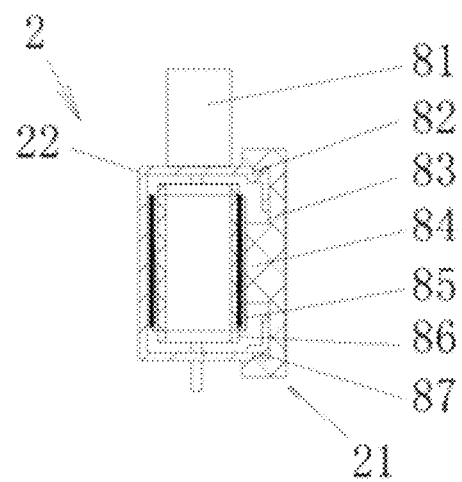
FIG. 7 is a structural schematic diagram of an upper power driving apparatus and a lower power driving apparatus in the present disclosure.

Optionally, as shown in FIG. 7, the upper power driving apparatus 2 may include:

the upper transverse rod 22, wherein the upper transverse rod may be of a hollow structure, wherein the upper transverse rod 22 can be provided with an open end 83, and two side surfaces, such as an upper side surface and a lower side surface, of the upper transverse rod 22 can be provided with a groove 87;

a first timing pulley 86 and a second timing pulley, which can be respectively rotatably fixed in the two end portions of the upper transverse rod 22;

a timing belt 85, which can be wound outside the first timing pulley 86 and the second timing pulley;

a motor 81, wherein a housing of the motor can be fixed to the upper transverse rod 22, a rotating shaft of the motor can be fixed to a central shaft of the first timing pulley 86 or the second timing pulley, wherein the motor 81 can be electrically connected to a controller, and a servo motor or a stepper motor, etc. can be selected as the motor 81; and the upper sliding block 21, wherein the upper sliding block can be provided with a bump 84 and two sliding rails 82, the bump 84 can be embedded into the open end 83 of the upper transverse rod 22 and fixed to the timing belt 85, and the sliding rails 82 can move back and forth only along the groove 87, wherein the lower power driving apparatus may be of the same structure as the upper power driving apparatus 2, the upper transverse rod 22 may be replaced with the lower transverse rod 62, and the upper sliding block 21 may be replaced with the lower sliding block 61.

An unloading apparatus of a dual power driving-based parallel movable shelf, as shown in FIG. 1-FIG. 4, may include:

the dual power driving-based parallel movable shelf according to an embodiment of the present disclosure, wherein the vertical rod 31 may be fixed with a vertical power driving apparatus and a vertical sliding block 32, the vertical power driving apparatus may be of the same structure as the upper power driving apparatus 2, the vertical rod 31 can replace the upper transverse rod 22, the vertical sliding block 32 can replace the upper sliding block 21, and a motor of the vertical power driving apparatus can be electrically connected to the controller; and a discharging apparatus 4, wherein the discharging apparatus can be fixed on the vertical sliding block 32, and can discharge received goods onto a predetermined shelf 5. When receiving goods, the discharging apparatus 4 can move to an edge of the rack 1 to receive the goods discharged by a robot.

Optionally, as shown in FIG. 1-FIG. 3, the discharging apparatus 4 may include:

a discharging frame 41, which can be fixed to the vertical sliding block 32;

a first speed reducer 44;

a rotation motor 43, wherein a housing of the rotation motor can be fixed to a housing of the first speed reducer 44, and a rotating shaft of the rotation motor can be fixed to an input shaft of the first speed reducer 44, and the rotation motor 43 can be electrically connected to the controller;

a rotation bracket 42, which can be fixed to an output shaft of the first speed reducer 44;

a rotation tray 40, which can be fixed to the rotation bracket 42, wherein the rotation tray 40 can be configured to hold goods;

a second speed reducer 46, a housing of which can be fixed to the discharging frame 41;

a swing motor 47, wherein a housing of the swing motor can be fixed to the housing of the second speed reducer 46, and a rotating shaft of the swing motor can be fixed to an input shaft of the second speed reducer 46, and the swing motor 47 can be electrically connected to the controller, wherein the rotation motor 43 and the swing motor 47 may be servo motors;

a swing rod 45, of which one end can be fixed to an output shaft of the second speed reducer 46, and the other end can be fixed to the housing of the first speed reducer 44, wherein rotation of the swing motor 47 can drive the swing rod 45 to rotate through the second speed reducer 46, so as to swing the rotation tray 40 loaded with goods from outside of the shelf 2 to a position above a predetermined container 51, and rotation of the rotation motor 43 can drive the rotation bracket 42 to rotate through the first speed reducer 44, so as to discharge the goods into the shelf 5.

In order to improve storage quantity of goods, two rows of shelves 5 may be provided, the two rows of shelves 5 are respectively located at two sides of the rack 1, and the discharging apparatus 4 can make the rotation tray 40 rotate to a position above the shelves 5 at a predetermined side of the two sides through the swing motor 47 and the second speed reducer 46, so as to discharge the goods into one of the containers 51.

Each container 51 has one address, and the controller discharges the goods into the assigned container 51 as needed.

In order to store more goods and take the goods conveniently, each shelf 5 may be provided with multiple layers, each layer is provided with two blocking bars, multiple containers 51 can be placed on the two blocking bars, and the containers 51 can be taken out from the two blocking bars.

The shelves 5 are movable and flexible to use.

INDUSTRIAL APPLICABILITY

For the dual power driving-based parallel movable shelf and the unloading apparatus thereof provided in the embodiments of the present disclosure, through the adjusting apparatus, the vertical rod can self-adaptively rotate with respect to the upper transverse rod and/or the lower transverse rod by an angle and move up and down by a distance, so as to eliminate the torque and eliminate the stress, thereby protecting the sliding blocks and the like from damage; and for the dual power driving-based parallel movable shelf and the unloading apparatus thereof provided in the embodiments of the present disclosure, the entire frame is built with aluminum profile, various parts are adjustably assembled on the entire frame in a modular form, so that installation and testing are flexible and convenient, and the installation and testing can be performed according to an actual specific operation environment.

What is claimed is:

1. A dual power driving-based parallel movable shelf, comprising:
   a rack;
   an upper transverse rod, wherein two ends of the upper transverse rod are respectively fixed to the rack, the upper transverse rod is fixed with an upper sliding block and an upper power driving apparatus, and the upper power driving apparatus can control the upper sliding block to move only back and forth along the upper transverse rod;
   a lower transverse rod, wherein two ends of the lower transverse rod are respectively fixed to the rack, the lower transverse rod; and the upper transverse rod are arranged substantially parallel to each other, the lower transverse rod is fixed with a lower sliding block and a lower power driving apparatus, and the lower power driving apparatus can control the lower sliding block to move only back and forth along the lower transverse rod;
   a vertical rod, wherein a top portion of the vertical rod is coupled to the upper sliding block through an upper adjusting apparatus, and a bottom portion of the vertical rod is coupled to the lower sliding block through a lower adjusting apparatus;

a controller, which is electrically connected to motors of the upper power driving apparatus and the lower power driving apparatus respectively, wherein when the upper sliding block and the lower sliding block drive the vertical rod to move towards the same direction, the upper adjusting apparatus can make the vertical rod rotate by an angle relative to the upper transverse rod, and the lower adjusting apparatus can make the vertical rod rotate by an angle relative to the lower transverse rod; the upper adjusting apparatus can make the vertical rod move up and down by a distance relative to the upper transverse rod, and/or the lower adjusting apparatus can make the vertical rod move up and down by a distance relative to the lower transverse rod.

2. The dual power driving-based parallel movable shelf according to claim 1, wherein the upper adjusting apparatus or the lower adjusting apparatus comprises:

an adjusting plate, which is provided with an adjusting hole, wherein one end of the adjusting plate is fixed to the upper sliding block or the lower sliding block; and an adjusting column, wherein a circumferential surface of the adjusting column is provided with an annular groove, the adjusting hole is sleeved on the annular groove and is capable of rotating with the adjusting column as center, and the adjusting column is fixed to the vertical rod.

3. The dual power driving-based parallel movable shelf according to claim 2, wherein the upper adjusting apparatus or the lower adjusting apparatus further comprises:

a flexible separation column, which is provided with an annular cavity and a through hole, wherein the flexible separation column is embedded into the annular groove of the adjusting column, a part of the adjusting plate is embedded into the annular cavity, and the flexible separation column can separate the adjusting plate from the adjusting column.

4. The dual power driving-based parallel movable shelf according to claim 3, wherein the flexible separation column is made of plastic, and the plastic is preferably a polytetrafluoroethylene material or polypropylene.

5. The dual power driving-based parallel movable shelf according to claim 1, wherein the upper transverse rod and the lower transverse rod are made of aluminum profiles.

6. The dual power driving-based parallel movable shelf according to claim 1, wherein the adjusting column is composed of two parts, and the two parts of the adjusting column are fastened together in a manner of capable of promoting installation and replacement of the flexible separation column.

7. The dual power driving-based parallel movable shelf according to claim 2, wherein an adjusting hole of the adjusting plate of at least one of the upper adjusting apparatus and the lower adjusting apparatus is an elongated hole, and the adjusting column can move up and down in the elongated hole.

8. The dual power driving-based parallel movable shelf according to claim 1, wherein the upper power driving apparatus comprises:

the upper transverse rod, which is of a hollow structure, wherein the upper transverse rod is provided with an open end, and two side surfaces, such as an upper side surface and a lower side surface, of the upper transverse rod are provided with a groove;

a first timing pulley and a second timing pulley, which can be respectively rotatably fixed in two end portions of the upper transverse rod;

a timing belt, which is wound outside the first timing pulley and the second timing pulley; and a motor, wherein a housing of the motor is fixed to the upper transverse rod, a rotating shaft of the motor is fixed to a central shaft of the first timing pulley or the second timing pulley, and the motor is electrically connected to the controller; and the upper sliding block, wherein the upper sliding block is provided with a bump and two sliding rails, the bump can be embedded into the open end of the upper transverse rod and fixed to the timing belt, and the sliding rails can only move back and forth along the groove, wherein the lower power driving apparatus is of the same structure as the upper power driving apparatus, the upper transverse rod can be replaced with the lower transverse rod, and the upper sliding block; can be replaced with the lower sliding block.

9. An unloading apparatus of a dual power driving-based parallel movable shelf, comprising:

the dual power driving-based parallel movable shelf according to claim 1, wherein the vertical rod is fixed with a vertical power driving apparatus and a vertical sliding block, the vertical power driving apparatus is of the same structure as the upper power driving apparatus, wherein the vertical rod can replace the upper transverse rod), the vertical sliding block can replace the upper sliding block, and a motor of the vertical power driving apparatus is electrically connected to the controller; and a discharging apparatus, wherein the discharging apparatus is fixed on the vertical sliding block, and can discharge received goods onto a predetermined shelf.

10. The unloading apparatus of a dual power driving-based parallel movable shelf according to claim 9, wherein the discharging apparatus comprises:

a discharging frame, which is fixed to the vertical sliding block;

a first speed reducer;

a rotation motor, wherein a housing of the rotation motor is fixed to a housing of the first speed reducer, and a rotating shaft of the rotation motor is fixed to an input shaft of the first speed reducer, and wherein the rotation motor is electrically connected to the controller;

a rotation bracket, which is fixed to an output shaft of the first speed reducer;

a rotation tray, which is fixed to the rotation bracket, wherein the rotation tray can be configured to hold goods;

a second speed reducer, wherein a housing of the second speed reducer is fixed to the discharging frame;

a swing motor, wherein a housing of the swing motor is fixed to the housing of the second speed reducer, and a rotating shaft of the swing motor is fixed to an input shaft of the second speed reducer, and wherein the swing motor is electrically connected to the controller, and a swing rod, wherein one end of the swing rod is fixed to an output shaft of the second speed reducer, and the other end of the swing rod is fixed to the housing of the first speed reducer, wherein rotation of the swing motor can drive the swing rod to rotate through the second speed reducer, so as to swing the rotation tray to a position above a predetermined container, and rotation of the rotation motor can drive the rotation bracket to rotate through the first speed reducer, so as to discharge the goods into the shelf.

11. The unloading apparatus of a dual power driving-based parallel movable shelf according to claim 10, wherein two rows of the shelves are provided, the two rows of shelves are respectively located on two sides of the rack, and the discharging apparatus can rotate the rotation tray to a position above the shelves at a predetermined side of the two sides through the swing motor and the second speed reducer, so as to discharge the goods into one of the containers.

12. The unloading apparatus of a dual power driving-based parallel movable shelf according to claim 11, wherein each shelf is provided as being of multiple layers, each layer is provided with two blocking bars, multiple containers can be placed on the two blocking bars, and the containers can be taken out from the two blocking bars.

13. The dual power driving-based parallel movable shelf according to claim 2, wherein the upper transverse rod and the lower transverse rod are made of aluminum profiles.

14. The dual power driving-based parallel movable shelf according to claim 3, wherein the upper transverse rod and the lower transverse rod are made of aluminum profiles.

15. The dual power driving-based parallel movable shelf according to claim 4, wherein the upper transverse rod and the lower transverse rod are made of aluminum profiles.

16. The dual power driving-based parallel movable shelf according to claim 2, wherein the adjusting column is composed of two parts, and the two parts of the adjusting column are fastened together in a manner of capable of promoting installation and replacement of the flexible separation column.

17. The dual power driving-based parallel movable shelf according to claim 3, wherein the adjusting column is composed of two parts, and the two parts of the adjusting column are fastened together in a manner of capable of promoting installation and replacement of the flexible separation column.

18. The dual power driving-based parallel movable shelf according to claim 4, wherein the adjusting column is composed of two parts, and the two parts of the adjusting column are fastened together in a manner of capable of promoting installation and replacement of the flexible separation column.

19. The dual power driving-based parallel movable shelf according to claim 5, wherein the adjusting column is composed of two parts, and the two parts of the adjusting column are fastened together in a manner of capable of promoting installation and replacement of the flexible separation column.

20. The dual power driving-based parallel movable shelf according to claim 3, wherein an adjusting bole of the adjusting plate of at least one of the upper adjusting apparatus and the lower adjusting apparatus is an elongated hole, and the adjusting column can move up and down in the elongated hole.

* * * * *

UNITED STATES PATENT AND TRADEMARK OFFICE
CERTIFICATE OF CORRECTION

| | | |
|---|---|---|
| PATENT NO. | : 12,365,554 B2 | Page 1 of 1 |
| APPLICATION NO. | : 18/037448 | |
| DATED | : July 22, 2025 | |
| INVENTOR(S) | : Jianqiang Zhu | |

It is certified that error appears in the above-identified patent and that said Letters Patent is hereby corrected as shown below:

In the Claims

Column 8, Claim 1, Line 56:
"lower transverse rod; and the upper transverse rod"
Should be:
– lower transverse rod and the upper transverse rod –

Column 10, Claim 9, Line 28:
"vertical rod can replace the upper transverse rod), the"
Should be:
– vertical rod can replace the upper transverse rod, the –

Column 10, Claim 10, Line 66:
"swing the rotation tray to a position above a predeter-"
Should be:
– swing the rotation tray loaded with goods from an outside shelf to a position above a predeter- –

Column 12, Claim 20, Line 23:
"according to claim 3, wherein an adjusting bole of the"
Should be:
– according to claim 3, wherein an adjusting hole of the –

Signed and Sealed this
Twenty-third Day of September, 2025

John A. Squires
*Director of the United States Patent and Trademark Office*